United States Patent

Maeda

(10) Patent No.: US 9,792,214 B2
(45) Date of Patent: Oct. 17, 2017

(54) CACHE MEMORY FOR PARTICULAR DATA

(71) Applicant: Toshiba Memory Corporation, Minato-ku, Tokyo (JP)

(72) Inventor: Seiji Maeda, Kawasaki Kanagawa (JP)

(73) Assignee: Toshiba Memory Corporation, Tokyo (JP)

( * ) Notice: Subject to any disclaimer, the term of this patent is extended or adjusted under 35 U.S.C. 154(b) by 0 days.

(21) Appl. No.: 14/641,827

(22) Filed: Mar. 9, 2015

(65) Prior Publication Data

US 2016/0070649 A1 Mar. 10, 2016

(30) Foreign Application Priority Data

Sep. 8, 2014 (JP) .................................. 2014-182426

(51) Int. Cl.
  *G06F 12/08* (2016.01)
  *G06F 12/0862* (2016.01)
  *G06F 12/0895* (2016.01)

(52) U.S. Cl.
  CPC ...... *G06F 12/0862* (2013.01); *G06F 12/0895* (2013.01); *G06F 2212/6022* (2013.01)

(58) Field of Classification Search
  None
  See application file for complete search history.

(56) References Cited

U.S. PATENT DOCUMENTS

| | | | |
|---|---|---|---|
| 5,991,847 A * | 11/1999 | Ballard et al. ...... | G06F 12/0866 711/130 |
| 6,490,654 B2 | 12/2002 | Wickeraad et al. | |
| 6,754,776 B2 | 6/2004 | Conway et al. | |
| 7,853,775 B2 | 12/2010 | Kyo | |
| 8,051,273 B2 | 11/2011 | Kyo | |
| 8,078,803 B2 | 12/2011 | Speier et al. | |
| 8,112,613 B2 | 2/2012 | Kyo | |
| 8,200,735 B2 | 6/2012 | Inoue | |
| 8,291,194 B2 * | 10/2012 | Tsai et al. ............. | G06F 3/0608 711/103 |
| 8,386,716 B2 | 2/2013 | Speier et al. | |
| 2004/0030847 A1 | 2/2004 | Tremaine | |

(Continued)

FOREIGN PATENT DOCUMENTS

| | | |
|---|---|---|
| JP | 56-032662 | 7/1981 |
| JP | 07-095307 B | 10/1995 |

OTHER PUBLICATIONS

U.S. Appl. No. 14/931,724, filed Nov. 3, 2015, Maeda.

(Continued)

*Primary Examiner* — Gary W Cygiel
(74) *Attorney, Agent, or Firm* — Knobbe, Martens, Olson & Bear, LLP

(57) ABSTRACT

According to an embodiment, a cache unit includes: a first memory configured to temporarily hold data and an address of the data, a second memory configured to temporarily hold an address of particular data set in advance, and a controller configured to, when an instruction to load the data is made for a first specified address, search for a storage destination of the first specified address, output the data of the first specified address if the storage destination is the first memory, and output the particular data if the storage destination is the second memory.

13 Claims, 3 Drawing Sheets

(56) References Cited

U.S. PATENT DOCUMENTS

| | | | |
|---|---|---|---|
| 2004/0049641 A1* | 3/2004 | So et al. | G06F 12/0862 |
| | | | 711/137 |
| 2005/0160228 A1 | 7/2005 | Teruyama | |
| 2005/0223127 A1 | 10/2005 | Boutcher et al. | |
| 2006/0143396 A1 | 6/2006 | Cabot | |
| 2012/0109897 A1 | 5/2012 | Janakiraman et al. | |
| 2012/0144130 A1 | 6/2012 | Fossum | |
| 2013/0166519 A1* | 6/2013 | Matsuse | G06F 17/30153 |
| | | | 707/693 |

OTHER PUBLICATIONS

Patterson, D.A., et al., "Computer Organization and Design", Aug. 16, 2004, Third Edition, pp. 545-579.
U.S. Appl. No. 14/484,093, filed Sep. 11, 2014, Usui et al.

* cited by examiner

CACHE MEMORY FOR PARTICULAR DATA

CROSS-REFERENCE TO RELATED APPLICATION

This application is based upon and claims the benefit of priority from the Japanese Patent Application No. 2014-182426, filed on Sep. 8, 2014; the entire contents of which are incorporated herein by reference.

FIELD

An embodiment described herein relates generally to a cache unit and a processor.

BACKGROUND

In general, operation processing speed of a processor or a hardware engine is faster than data providing speed of a main memory constituted by a DRAM or the like. A cache memory is used to make up for the speed difference. The cache memory is a memory constituted by an SRAM or the like that operates at a higher speed than a main memory, and it temporarily stores data of the main memory. A processor and the like can perform high-speed processing by accessing data stored not in the main memory but in the cache memory. The cache memory has a smaller capacity in comparison with the main memory, and it stores only a part of data of the main memory in unit of a predetermined block size.

The data stored in the main memory is, for example, a matrix. When a processor or the like accesses the matrix, a part of the matrix is copied to the cache memory. A matrix is classified as a sparse matrix in which most of its elements have the same value (for example, zero) or a dense matrix which is constituted by a variety of different elements. In general, a matrix used for scientific and technical calculation is a sparse matrix in many cases.

Conventionally, when data stored in a main memory is a sparse matrix, all data included in a specified part of the matrix is copied to a cache though most of the data is the same data. That is, even when the data is a sparse matrix, the cache memory is required to have a storage capacity corresponding to an amount of data used by a processor or the like.

The cache memory, however, is expensive, and there is a great demand for downsizing of apparatuses. Therefore, there is a demand for reducing storage capacity as far as possible.

DETAILED DESCRIPTION

A cache unit of an embodiment includes: a first memory configured to temporarily hold data and an address of the data, a second memory configured to temporarily hold an address of particular data set in advance, and a controller configured to, when an instruction to load the data is made for a first specified address, search for a storage destination of the first specified address, output the data of the first specified address if the storage destination is the first memory, and output the particular data if the storage destination is the second memory.

(Embodiment)

An embodiment will be described below with reference to drawings.

(Configuration)

Figure 1:
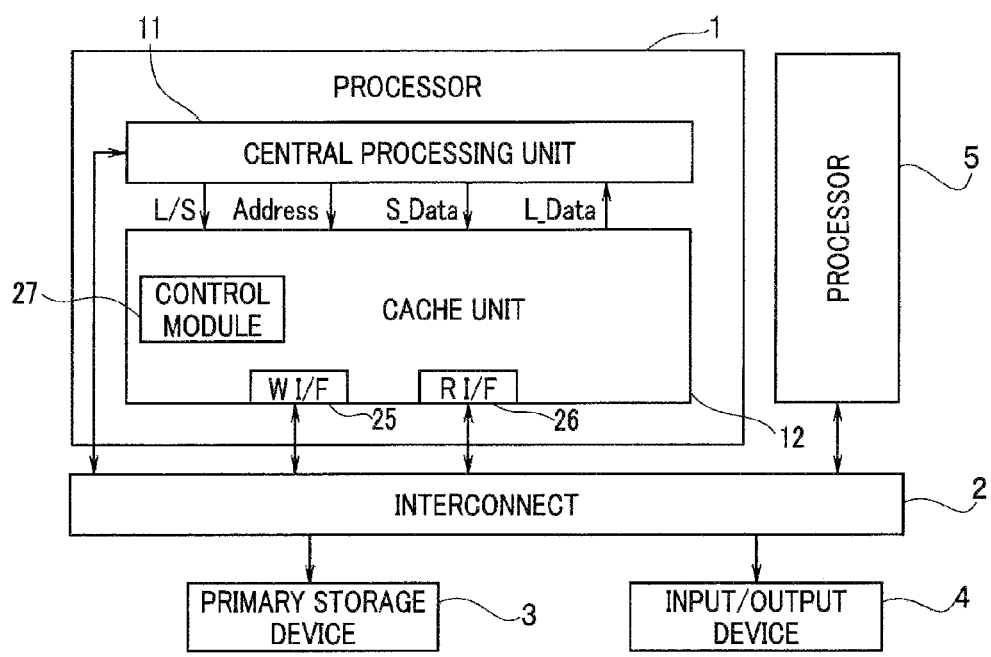
FIG. 1 is a schematic block diagram illustrating a configuration of a system which includes a cache unit 12 according to an embodiment of the present invention.

FIG. 1 is a schematic block diagram illustrating a configuration of a system which includes a cache unit 12 according to the embodiment of the present invention. The system which includes the cache unit 12 of the present embodiment is configured mainly with a processor 1 which includes a central processing unit (hereinafter referred to as a CPU) 11 and the cache unit 12, a primary storage device 3, which is a main memory, an input/output device 4 and an interconnect 2. The CPU 11, the cache unit 12, the primary storage device 3 and the input/output device 4 are connected to one another via the interconnect 2. A separate processor 5 can be connected to the interconnect 2. The processor 5 may be provided with a cache unit or may be configured so as to share and use the cache unit 12 of the processor 1.

The CPU 11 performs operation of various kinds of data. The CPU 11 is connected to the cache unit 12 and the interconnect 2 and acquires data required for operation (including programs) from the primary storage device 3 via the cache unit 12 or the interconnect 2. The cache unit 12 temporarily stores various kinds of data. More specifically, the cache unit 12 holds data stored by the CPU 11 and data acquired from the primary storage device 3.

The primary storage device 3 records data acquired from the input/output device 4 or data outputted from the CPU 11 and the cache unit 12. The input/output device 4 inputs data from the outside of the system shown in FIG. 1 to the primary storage device 3 and outputs data from the primary storage device 3 to the outside of the system. Data required for an operation of this system, including a program, is inputted from the input/output device 4.

The cache unit 12 acquires each data of a load/store (L/S) flag, an address and store data (S_Data) from the CPU 11. The load/store flag is a flag for identifying whether to output (store) data from the CPU 11 to the cache unit 12 or to input (load) data from the cache unit 12 to the CPU 11. For example, "0" is set to the load/store flag in the case of loading, and "1" is set to the load/store flag in the case of storage. The address is divided into a tag and an index at a particular bit width. The cache unit 12 outputs load data (L_Data) to the CPU 11.

Furthermore, the cache unit 12 outputs data to the primary storage device 3 via a write interface (W I/F) 25 and through the interconnect 2. The cache unit 12 also acquires data from the primary storage device 3 through the interconnect 2 and via a read interface (R I/F) 26. Control of all operations of the cache unit 12 is performed by a control module 27.

Figure 2:
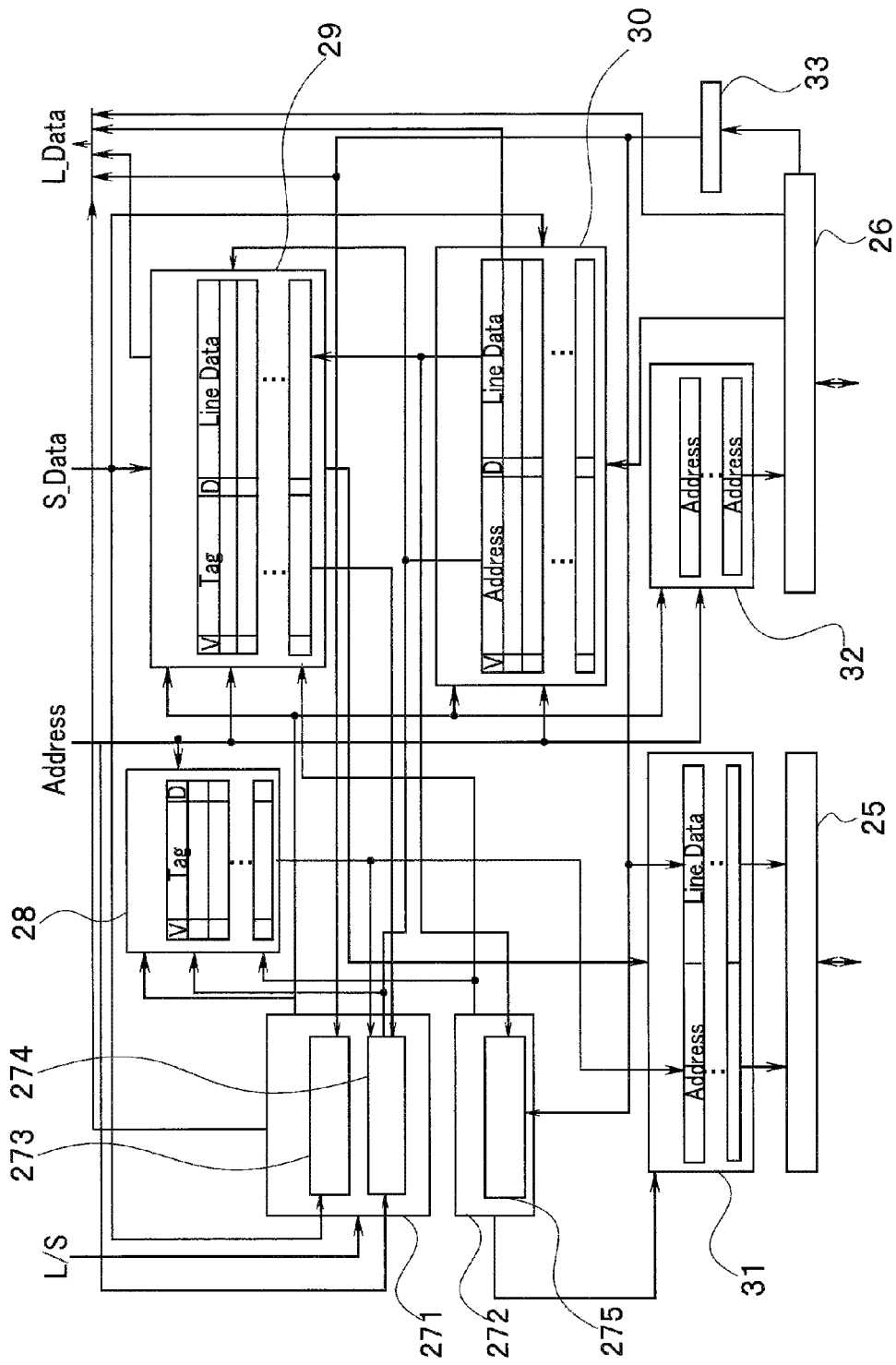
FIG. 2 is a schematic block diagram illustrating an example of the configuration of the cache unit 12.

Next, a detailed configuration of the cache unit 12 will be described. FIG. 2 is a schematic block diagram illustrating an example of the configuration of the cache unit 12. The cache unit 12 in FIG. 2 is configured with a particular data tag 28 as a second memory, a general data cache (hereinafter referred to as a cache) 29 as a first memory, a refill buffer 30, a write queue 31, the write interface 25, a read queue 32, the read interface 26, a particular data register 33, a comparison/control module 271, which is a first comparison/control module, and a comparison/control module 272, which is a second comparison/control module. The comparison/control modules 271 and 272 are included in the control module 27 in FIG. 1.

The particular data tag 28 is a mechanism for managing a state of temporarily stored particular data. Here, the particular data is certain data included in data, for example, a lot of data or continuously included data. For example, since a lot of "0s" are included in a sparse matrix, "0" may be the particular data. Since background values are continuously included in image data, the background values may be the particular data. The particular data tag 28 is configured with a plurality of particular data tag entries, and each particular data tag entry is configured with a valid bit (V) for identifying whether the entry is valid or not, an address tag (Tag) showing an address of particular data, and a dirty bit (D) for identifying whether the entry has been rewritten or not.

The cache 29 is a mechanism for temporarily storing data other than the particular data and is configured with a cache tag and a cache line array. The cache tag is configured with a plurality of cache tag entries. Each cache tag entry is configured with a valid bit (V), an address tag (Tag) and a dirty bit (D). The cache line array is configured with a plurality of pieces of line data (Line Data). A cache tag entry and a cache line are associated with each other one to one.

The refill buffer 30 provides data acquired from the primary storage device 3 or data acquired from the CPU 11 to one of the particular data tag 28 and the cache 29. The refill buffer 30 is configured with a refill tag and a refill line array. The refill tag is configured with a plurality of refill tag entries, and each refill tag entry is configured with a valid bit (V), an address (Address) and a dirty bit (D). The refill line array is configured with a plurality of pieces of line data (Line Data). A refill tag entry and a refill line are associated with each other one to one.

The write queue 31 outputs data to the primary storage device 3 via the write interface 25. The write queue 31 is configured with a plurality of write queue entries. Each write queue entry is configured with an address (Address) and line data (Line Data).

The read queue 32 acquires data from the primary storage device 3 via the read interface 26. The read queue 32 is configured with a plurality of read queue entries. Each read queue entry is configured with an address (Address).

The particular data register 33 is a register for storing particular data managed by the particular data tag 28. The particular data is specified by the CPU 11. In the case of fixing the particular data to a certain value (for example, "0"), the value of the register 33 may be fixed, or the fixed value may be inputted at each output destination of the register 33.

That is, in the present embodiment, as for the particular data, only an address tag is stored in the particular data tag 28 without storing the data itself, by providing the particular data register 33 and the particular data tag 28. Thereby, in comparison with a case of storing all data into a cache, an amount of use of the cache memory can be reduced.

The comparison/control module 271 controls a data flow between the CPU 11 and the cache unit 12. In the case of loading, the comparison/control module 271 determines from which of the cache 29, the particular data register 33 and the refill buffer 30 data is to be loaded to the CPU 11. In the case of storage, the comparison/control module 271 determines into which of the particular data tag 28, the cache 29 and the refill buffer 30 store data and an address acquired from the CPU 11 are to be stored. The comparison/control module 271 is configured with a data comparing module 273 and an address comparing module 274. The data comparing module 273 compares store data with particular data. The address comparing module 274 compares an address acquired from the CPU 11 with addresses stored in the cache tag entry of the cache 29, the particular data register 33 and the refill buffer 30.

The comparison/control module 272 controls a refill destination of data stored in a refill line array of the refill buffer 30. More specifically, the comparison/control module 272 is configured with a data comparing module 275 which compares the data of the refill line array with particular data.

(Operation)

Next, an operation of the cache unit 12 in the present embodiment will be described. First, a case of loading data from the cache unit 12 to the CPU 11 will be described.

A flag indicating loading as a load/store flag and an address where data to be loaded is stored are inputted from the CPU 11 to the cache unit 12. The load/store flag and the address are inputted to the comparison/control module 271. The address comparing module 274 judges whether or not an entry of the inputted address exists in the particular data tag 28, the cache 29 and the refill buffer 30 (address hit judgment).

The address hit judgment for the particular data tag 28 is performed as shown below. First, on the basis of an index of the inputted address, a relevant particular data tag entry is extracted. Otherwise, the particular data tag entry may be extracted on the basis of a tag of the inputted address. If a valid bit of the extracted particular data tag entry shows "invalid", it is judged that the entry of the inputted address does not exist. On the other hand, if the valid bit shows "valid", an address tag of the extracted particular data tag entry is compared with the tag of the inputted address. If both tags are different from each other, it is judged that the entry of the inputted address does not exist. If both tags are the same, it is judged that the entry of the inputted address exists in the particular data tag 28.

The address hit judgment for the cache 29 is performed as shown below. First, on the basis of an index of the inputted address, a relevant cache tag entry is extracted. Otherwise, the cache tag entry may be extracted on the basis of a tag of the inputted address. If a valid bit of the extracted cache tag entry shows "invalid", it is judged that the entry of the inputted address does not exist. On the other hand, if the valid bit shows "valid", an address tag of the extracted cache tag entry is compared with the tag of the inputted address. If both tags are different from each other, it is judged that the entry of the inputted address does not exist. If both tags are the same, it is judged that the entry of the inputted address exists in the cache 29.

The address hit judgment for the refill buffer 30 is performed as shown below. That is, such an entry that an address of a refill tag entry and the inputted address are the same is extracted. If the entry cannot be extracted, it is judged that the entry of the inputted address does not exist. If a valid bit of the extracted refill tag entry shows "invalid", it is judged that the entry of the inputted address does not exist. On the other hand, if the valid bit shows "valid", it is judged that the entry of the inputted address exists in the refill buffer 30.

If it is judged that the entry of the address inputted to the particular data tag 28 exists in the above address hit judgment, particular data is outputted to the CPU 11 as load data. If it is judged that the entry of the address inputted to the cache 29 exists, line data associated with the entry is outputted to the CPU 11 as load data. If it is judged that the entry of the address inputted to the refill buffer 30 exists, line data associated with the entry is outputted to the CPU 11 as load data.

On the other hand, if it is judged that the entry of the inputted address does not exist in any of the particular data tag 28, the cache 29 and the refill buffer 30, the control module 27 specifies the inputted address to the read queue 32 and instructs the read queue 32 to read out data of the address from the primary storage device 3. Using the specified address, the read queue 32 acquires the data of the address from the primary storage device 3 via the read interface 26. The read interface 26 outputs the acquired data to the CPU 11 as load data and outputs the specified address and the acquired data to the refill buffer 30 as line data.

The refill buffer 30 extracts one refill tag entry having a valid bit showing "invalid", stores the address inputted from the read interface 26 into an address and sets the valid bit to "valid". The dirty bit is set to "invalid" indicating that the entry has not been rewritten. Furthermore, the refill buffer 30 stores the data read out from the primary storage device 3 into the line data. If there is not a refill tag entry having a valid bit showing "invalid", in the refill buffer 30, a standby state continues until the refill tag entry having a valid bit showing "invalid" is obtained. Through the above series of operations, loading of the data from the cache unit 12 to the CPU 11 is completed.

Note that, if a refill tag entry having a valid bit showing "invalid" does not exist in the refill buffer 30, one entry having a valid bit showing "valid" is selected, and a refill request is given to the particular data tag 28 or the cache 29 together with the line data.

Next, a case of storing data from the CPU 11 to the cache unit 12 will be described. A flag indicating storage as a load/store flag, an address where data to be loaded is stored, and store data are inputted from the CPU 11 to the cache unit 12. The load/store flag, the address and the store data are inputted to the comparison/control module 271. The address comparing module 274 judges whether or not an entry of the address inputted from the CPU 11 exists for the particular data tag 28, the cache 29 and the refill buffer 30 (address hit judgment). A detailed method of the address hit judgment is similar to the case of loading data to the CPU 11 described above.

If it is judged that the entry of the address inputted to the particular data tag 28 exists in the address hit judgment, the store data is compared with particular data by the data comparing module 273. If both correspond to each other, storage of the data from the CPU 11 to the cache unit 12 is completed. On the other hand, if both do not correspond to each other, the valid bit of the entry is set to "invalid". That is, it is set that the entry of the address inputted to the particular data tag 28 does not exist.

If it is judged that the entry of the address inputted to the cache 29 exists in the address hit judgment, the store data is stored into corresponding line data. Then, the dirty bit of the entry is set to "valid" indicating that the entry has been rewritten.

If it is judged that the entry of the address inputted to the refill buffer 30 exists, the store data is stored into corresponding line data. Then, the dirty bit of the entry is set to "dirty".

If it is judged that the entry of the inputted address does not exist in any of the particular data tag 28, the cache 29 and the refill buffer 30, the control module 27 outputs the inputted address and store data to the refill buffer 30.

The refill buffer 30 extracts one refill tag entry having a valid bit showing "invalid", stores the inputted address into an address of the entry. The valid bit of the entry is set to "valid". The dirty bit of the entry is set to "dirty". Furthermore, the store data is stored into line data associated with the entry. If there is not a refill tag entry having a valid bit showing "invalid", in the refill buffer 30, a standby state continues until the refill tag entry having a valid bit showing "invalid" is obtained. Through the above series of operations, storage of the data from the CPU 11 to the cache unit 12 is completed.

Next, a line data refilling operation from the refill buffer 30 to the particular data tag 28 or the cache 29 will be described.

First, the comparison/control module 272 determines to which of the particular data tag 28 and the cache 29 a refill request is to be made. More specifically, line data for which the refill request is made and particular data stored in the particular data register 33 are compared by the data comparing module 275. If the line data and the particular data correspond to each other, the refill request is made to the particular data tag 28. If the line data and the particular data do not correspond to each other, the comparison/control module 272 makes the refill request to the cache 29.

In the case of giving the refill request to the particular data tag 28, the comparison/control module 272 extracts a corresponding particular data tag entry using an index of an address of an entry for which the refill request is made. If a valid bit of the extracted particular data tag entry shows "invalid", the comparison/control module 272 performs a refill process shown below. That is, the particular data tag 28 sets the valid bit of the extracted entry to "valid", stores a tag of the address of the entry into a tag, and stores a value of a dirty bit of the entry for which the refill request is made into a dirty bit.

On the other hand, if the valid bit of the extracted particular data tag entry shows "valid", the comparison/control module 272 configures an address for writing to the primary storage device 3 from the tag of the extracted entry and the index of the address for which the refill request is made. Then, the comparison/control module 272 outputs the configured address and the particular data to the write queue 31. After writing of the data to the write queue 31 ends, the refill process described above is performed for the entry of the particular data tag 28.

In the case of giving the refill request to the cache 29, the comparison/control module 272 extracts a corresponding cache tag entry using the index of the address of the entry for which the refill request is made. If a valid bit of the extracted cache tag entry shows "invalid", a refill process shown below is performed. That is, the cache 29 sets the valid bit of the extracted entry to "valid", stores a tag of the address of the entry into a tag, stores a value of a dirty bit of the entry for which the refill request is made into a dirty bit, and stores the data for which the refill request is made into line data.

On the other hand, if the valid bit of the extracted cache tag entry shows "valid", the comparison/control module 272 configures an address for writing to the primary storage device 3 from the tag of the extracted entry and the index of the address for which the refill request is made. Then, the comparison/control module 272 outputs the configured address and line data associated with the extracted entry to the write queue 31. After writing of the data to the write queue 31 ends, the refill process described above is performed for the entry of the cache 29.

Note that the address and the line data which have been written into the write queue 31 are outputted to the primary storage device 3 via the write interface 25 at a predetermined timing. The outputted line data is stored at the address of the primary storage device 3.

After the refill tag entry for which the refill request is made is refilled in any one of the particular data tag 28 and the cache 29 that has been selected, the valid bit of the entry is set to "invalid", and the series of refill operations are completed.

Note that timing of the series of refill operations is not limited to the timing when a load/store instruction is inputted from the CPU 11 to the cache unit 12. The series of refill operations may be performed at any time, for example, during an idle time period of the CPU 11.

As described above, according to the present embodiment, a control module which judges whether cache data is particular data or not and a particular data tag which stores only management information other than data such as addresses are provided in addition to an ordinary data cache. Therefore, when cache data is particular data, the data can be temporarily held by storing only management information into the particular data tag, and it is not necessary to store the data. Thus, it is possible to suppress an amount of use of the cache memory.

As for a data structure of a cache memory, and a method of accessing the cache memory, the cache unit of the present embodiment is not different from an ordinary one at all. Therefore, the cache unit can be used by connecting to an arbitrary CPU. It is also possible to connect the cache unit to a plurality of CPUs so that the cache unit can be shared. (Modification)

Figure 3:
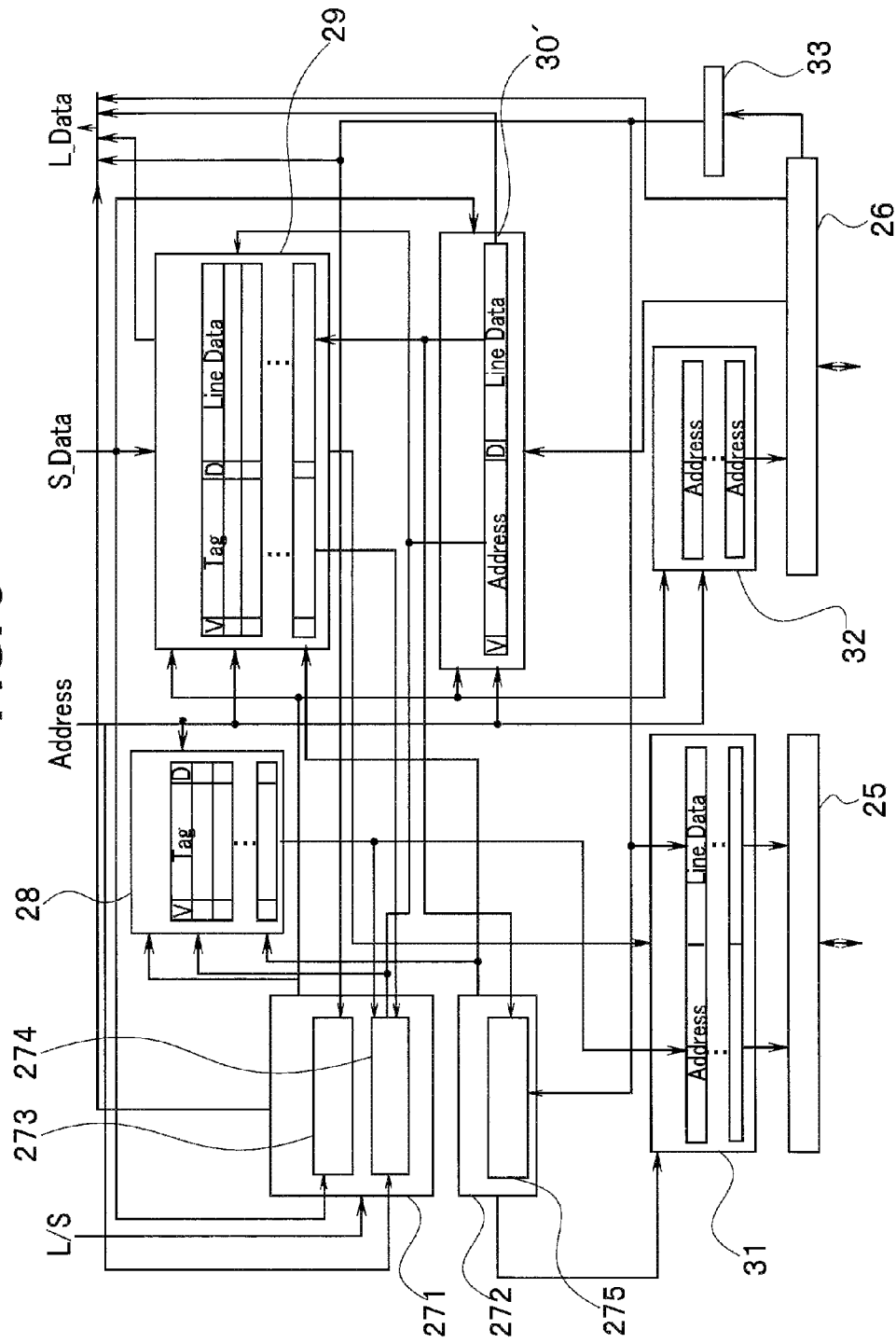
FIG. 3 is a schematic block diagram illustrating a modification of the configuration of the cache unit 12.

Though the refill tag of the refill buffer 30 is configured with a plurality of refill tag entries and a refill line array in the embodiment described above, the refill tag may be configured only with one refill tag entry and one piece of line data. FIG. 3 is a schematic block diagram illustrating a modification of the configuration of the cache unit 12. As shown in FIG. 3, it is also possible to configure a refill buffer 30' only with one refill tag and one piece of line data, make a refill request to the particular data tag 28 or the cache 29 each time data is newly stored into the refill buffer 30', and refill the data into any one of the particular data tag 28 and the cache 29.

Each "module" in the present specification conceptually corresponds to each function of the embodiment and does not necessarily correspond to particular hardware or a software routine one to one. Therefore, in the present specification, the embodiment has been described on the assumption of virtual circuit blocks (modules) having respective functions of the embodiment.

While certain embodiments have been described, these embodiments have been presented by way of example only, and are not intended to limit the scope of the inventions. Indeed, the novel methods and devices described herein may be embodied in a variety of other forms; furthermore, various omissions, substitutions and changes in the form of the methods and devices described herein may be made without departing from the spirit of the inventions. The accompanying claims and their equivalents are intended to cover such forms or modifications as would fall within the scope and spirit of the inventions.

What is claimed is:

1. A cache unit comprising:
a first memory configured to temporarily hold data and an address of the data;
a second memory configured to temporarily hold an address of a particular data set in advance, the particular data being not held by the first memory; and
a controller comprising a first comparison/control module that includes a data comparing module configured to judge whether arbitrary data is the particular data or not and an address comparing module configured to search for a storage destination of an arbitrary address,
wherein, when an instruction to load first data is made for a first specified address, the controller searches for a storage destination of the first specified address, outputs the data of the first specified address if the storage destination is the first memory, and outputs the particular data if the storage destination is the second memory, and
wherein, when an instruction to store a specified data at a second specified address is made, the controller judges whether the specified data is the particular data or not, stores the second specified address and the specified data into the first memory if the specified data is not the particular data, and stores the second specified address into the second memory if the specified data is the particular data.

2. The cache unit according to claim 1, further comprising a second comparison/control module that includes a data comparing module configured to judge whether data to be temporarily held is the particular data or not, wherein
the data to be temporarily held and an address thereof are stored into the first memory if the data to be temporarily held is not the particular data, and the address of the data to be temporarily held is stored into the second memory if the data to be temporarily held is the particular data.

3. The cache unit according to claim 2, wherein
when an instruction to store specified data of a second specified address is made, the first comparison/control module judges whether the specified data is the particular data or not and searches for a storage destination of the second specified address,
if the specified data is not the particular data, and the storage destination is the first memory, then the specified data is stored into the first memory, and a process is completed,
if the specified data is not the particular data, and the storage destination is the second memory, then the second specified address of the second memory is invalidated,
if the specified data is the particular data, and the storage destination is the first memory, then the second specified address of the first memory is invalidated, and
if the specified data is the particular data, and the storage destination is the second memory, then the process is completed.

4. The cache unit according to claim 3, wherein the particular data is zero data.

5. The cache unit according to claim 1, wherein the particular data is zero data.

6. A processor comprising:
a cache unit; and
a CPU configured to perform operation of data acquired from the cache unit, wherein
the cache unit comprises: a first memory configured to temporarily hold the data and an address of the data; a second memory configured to temporarily hold an address of a particular data set in advance, the particular data being not held by the first memory; and a controller comprising a first comparison/control module that includes a data comparing module configured to judge whether arbitrary data is the particular data or not and an address comparing module configured to search for a storage destination of an arbitrary address,
wherein, when a first address is specified by the CPU and an instruction to load data is made, the controller searches for a storage destination of the first specified address, outputs the data of the first specified address if the storage destination is the first memory, and outputs the particular data to the CPU if the storage destination is the second memory, and wherein, when an instruction to store specified data at a second specified address is made by the CPU, the controller judges whether the specified data is the particular data or not, stores the second specified address and the specified data into the first memory if the specified data is not the particular data, and stores the second specified address into the second memory if the specified data is the particular data.

7. The processor according to claim 6, wherein the cache unit further comprises a second comparison/control module comprising a data comparing module configured to judge whether data to be temporarily held is the particular data or not, and the data to be temporarily held and an address of the data to be temporarily held are stored into the first memory if the data to be temporarily held is not the particular data, and the data to be temporarily held is stored into the second memory if the data to be temporarily held is the particular data.

8. The processor according to claim 7, wherein when an instruction to store specified data at a second specified address is made, the first comparison/control module of the cache unit judges whether the specified data is the particular data or not and searches for a storage destination of the second specified address, if the specified data is not the particular data, and the storage destination is the first memory, then the specified data is stored into the first memory, and a process is completed, if the specified data is not the particular data, and the storage destination is the second memory, then the second specified address of the second memory is invalidated, if the specified data is the particular data, and the storage destination is the first memory, then the second specified address of the first memory is invalidated, and if the specified data is the particular data, and the storage destination is the second memory, then the process is completed.

9. A cache unit comprising:
a first memory configured to temporarily hold first data and an address of the first data;
a second memory configured to temporarily hold an address of a particular data set in advance, the particular data being not held by the first memory;
a buffer configured to hold second data and an address of the second data to be provided to the first memory and the second memory; and
a controller comprising a first comparison/control module and a second comparison/control module, the first comparison/control module including a data comparing module configured to judge whether arbitrary data is the particular data or not and an address comparing module configured to search for a storage destination of an arbitrary address, and the second comparison/control module including a data comparing module configured to judge whether the data outputted from the buffer is the particular data or not,
wherein when an instruction to store specified data at a second specified address is made, the controller judges whether the specified data is the particular data or not, stores the second specified address and the specified data into the first memory if the specified data is not the particular data, and stores the second specified address into the second memory if the specified data is the particular data.

10. The cache unit according to claim 9, wherein the buffer holds the data in plurality and the address in plurality.

11. The cache unit according to claim 9, wherein, when an instruction to load data is made for a first specified address, the first comparison/control module searches for a storage destination of the first specified address, outputs the data of the first specified address if the storage destination is the first memory, and outputs the particular data if the storage destination is the second memory.

12. The cache unit according to claim 9, wherein, if the second data outputted from the buffer is not the particular data, the second data and an address of the second data are stored into the first memory; and, if the second data outputted from the buffer is the particular data, the address of the second data is stored into the second memory.

13. The cache unit according to claim 9, wherein the particular data is zero data.

* * * * *